United States Patent [19]

Green

[11] 4,358,489
[45] Nov. 9, 1982

[54] MOUNTING TAPE

[75] Inventor: Alfred J. Green, Red Lion, Pa.

[73] Assignee: Adhesives Research, Inc., Glen Rock, Pa.

[21] Appl. No.: 239,222

[22] Filed: Feb. 27, 1981

[51] Int. Cl.³ .................. B60R 13/00; B32B 7/10; C09J 7/02
[52] U.S. Cl. ...................... 428/31; 428/40; 428/314.4; 428/317.3; 428/317.7; 428/355
[58] Field of Search .............. 428/310, 311, 315, 355, 428/40, 31, 314.4, 314.8, 317.1, 317.3, 317.7, 354

[56] References Cited

U.S. PATENT DOCUMENTS

| | | | |
|---|---|---|---|
| 3,265,765 | 8/1966 | Holden et al. | 525/271 |
| 3,325,430 | 6/1967 | Grasley | 260/25 |
| 3,340,224 | 9/1967 | Sherman et al. | 260/42.28 |
| 3,451,709 | 6/1969 | Swauger | 293/1 |
| 3,471,355 | 10/1969 | Truesdell et al. | 428/161 |
| 3,472,546 | 10/1969 | Samuels | 293/1 |
| 3,572,799 | 3/1971 | Truesdell et al. | 293/1 |
| 3,606,431 | 9/1971 | Kunevicius | 293/1 |
| 3,625,752 | 12/1971 | Korpman | 428/355 |
| 3,687,792 | 11/1972 | Ruff | 428/189 |
| 3,703,747 | 11/1972 | Hamman | 24/289 |
| 3,787,531 | 1/1974 | Dahlquist et al. | 428/355 |
| 3,837,984 | 9/1974 | Wagner et al. | 428/349 |
| 3,837,994 | 9/1974 | Flanagan et al. | 428/122 |
| 3,916,055 | 10/1975 | Wagner | 428/161 |
| 3,917,551 | 11/1975 | Jurrens et al. | 260/27 BB |
| 3,917,607 | 11/1975 | Crossland et al. | 260/27 BB |
| 3,932,328 | 1/1976 | Korpman | 428/355 |
| 4,010,297 | 3/1977 | Wenrick | 428/31 |
| 4,017,436 | 4/1977 | Tabana et al. | 260/27 BB |
| 4,061,820 | 12/1977 | Magid et al. | 428/310 |
| 4,130,948 | 12/1978 | Krug | 428/314.4 |
| 4,135,037 | 1/1979 | Udipi et al. | 428/414 |
| 4,169,822 | 10/1979 | Kutch et al. | 525/109 |
| 4,189,411 | 2/1980 | Haaf | 525/50 |
| 4,189,419 | 2/1980 | Takemoto et al. | 260/29.7 NR |

OTHER PUBLICATIONS

Shell Chemical Co., Kraton Thermoplastic Rubber Crumb, 8/72.
Shell Chemical Co., Kraton Rubber, 3/77.

Primary Examiner—William J. Van Balen
Attorney, Agent, or Firm—Jones, Tullar & Cooper

[57] ABSTRACT

The adhesive coated foam laminates of the present invention comprise a polyolefin or polyvinyl chloride foam layer coated on one or more sides with a pressure sensitive adhesive which comprises:
  (a) a block polymer of monovinyl aromatic hydrocarbon and either a conjugated diene or ethylene-butylene;
  (b) at least two distinct tackifying resins; and
  (c) at least one oxidation stabilizer.

8 Claims, 2 Drawing Figures

MOUNTING TAPE

BACKGROUND OF THE INVENTION

Pressure sensitive mounting tapes for high temperature creep resistant applications such as automotive specification requirements have heretofore been made with foams other than polyolefins because of the difficulty in obtaining a high temperature resistant bond of a pressure sensitive adhesive to polyolefins in comparison to other foams such as polychloroprene, polyurethane, and polyacrylate.

The present invention demonstrates that high temperature performances can be attained with a particularly formulated pressure sensitive adhesive in combination with a polyolefin foam. This product possesses characteristics such that its high temperature shear resistance is even greater than that observed with the aforementioned products currently being used in these applications.

SUMMARY OF THE INVENTION

The adhesive-foam laminates of the instant invention comprise a low weight foam material consisting of a foamed polyolefin such as polyethylene, or a copolymer thereof, such as containing minor amounts of polyvinyl acetate, or a foamed polyvinyl chloride, having one or more sides coated with a pressure sensitive adhesive. This adhesive coated foam can be easily attached to any of a number of surfaces, such as metal, wood, plaster, and ceramic surfaces and the like. The adhesive coated foam products of the present invention, once adhesively attached to a surface, remain firmly attached in spite of severe weather conditions such as high temperatures, freezing temperatures or extreme humidities.

One of the useful applications of the adhesive products of the present invention is that of a mounting strip for trim stripping on the sides of automobiles. The advantages of the use of the adhesive coated core products of the instant invention over the use of other adhesive coated foam laminates presently used as mounting strips, such as adhesive coated polyurethane foams, include lower cost, and improved adhesion in all types of weather conditions.

DETAILED DESCRIPTION OF PREFERRED EMBODIMENTS

Figure 1:
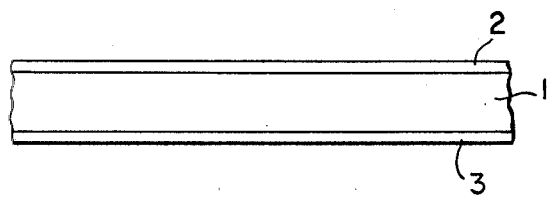
FIG. 1 is a schematic representation of the laminate of the invention, wherein 1 is a polyethylene foam core and 2 and 3 are adhesive layers.
Figure 2:
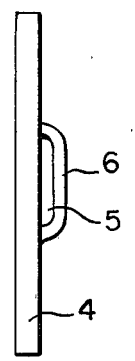
FIG. 2 is a schematic representation of a use of the mounting tape which 4 is an exterior automotive panel, 5 is the laminate of FIG. 1 and 6 is a chrome molding strip.

The adhesive coated foam laminates of the present invention comprise a relatively thin polyolefin or polyvinyl chloride foam layer coated on one or more sides with a pressure sensitive adhesive which comprises:
(a) a block polymer of monovinyl aromatic hydrocarbons and either a conjugated diene or ethylene-butylene;
(b) at least two distinct tackifying resins; and
(c) at least one oxidation stabilizer.

A foam core product having only one adhesive coated face is contemplated as part of the present invention and may be useful as protective foam stripping as printable lable stock and the like. The foam layer may be made from any light weight polyolefin (e.g. polyethylene or polypropylene) or polyvinylchloride foam material such as polyethylene foams, including closed cell crosslinked polyethylene foams and crosslinked polyethylene copolymer foams containing minor amounts of copolymerized vinyl acetate. Examples of commercially available foams contemplated for use in the present invention include Volara Type A foam and Volara Type E foam manufactured by Voltek, Inc. Adhesive foam pad fasteners are known in the art for mounting household articles. The thin foam layer employed in those pads can be employed in the laminates of the present invention.

The foam material may be produced and used in any configuration having two or more sides with one or more sides being adhesively coated. While the foam core may be configured for attachment to any irregular surface and any such configuration is contemplated to be within the scope of the present invention, the present invention will be illustrated through the use of rectangular cross section foam having adhesive coating on both of the major rectangular surfaces. Generally the foam layer will be less than about ½ inch thick, usually about ¼ inch or less.

ADHESIVE COMPOSITION

The adhesive compositions utilized in the production of the adhesive-foam laminate comprises:
(a) a block polymer of monovinyl aromatic hydrocarbon and either a conjugated diene or ethylene-butylene;
(b) at least two distinct tackifying resins which serve to extend the adhesive properties of the system; and
(c) at least one stabilizer.

The basic polymer component of the adhesive composition may be described as an unvulcanized elastomeric block copolymer wherein the respective monomeric moieties are arranged in an alternating sequence having the general configuration A-B-A wherein A is a non-elastomeric polymer block derived from a monovinyl aromatic hydrocarbon monomer and B is an elastomeric polymer block derived from the moieties of a conjugated diene monomer or ethylene-butylene; the total concentration of the A block therein ranging from about 20 to 50%, as based on the total weight of the polymer. An additional configuration which has been applied to these three unit block polymers if $(SSS)_n-(BBB)_n (SSS)_n$ wherein S represents the moieties derived from the vinyl substituted aromatic hydrocarbon monomer in which the vinyl group is attached to a nuclear carbon atom and B represents the moieties derived from the conjugated diene monomer or ethylene-butylene. It should be noted that, in these polymers, styrene is ordinarily used as the monovinyl aromatic hydrocarbon member while butadiene or isoprene are the most frequently used conjugated diene members. Thus, for example, styrene-butadiene-styrene polymers are commercially available under the trademarks "Kraton 1101", "Kraton 1102," "Kraton 4122," "Kraton 4141," and "Kraton 4150." Styrene-isoprene-styrene polymers are commercially available under the trademark "Kraton 1107" and the styrene-ethylene-butylene-styrene polymers are commercially available under the trademark "Kraton G 1650," "Kraton G 1652," and "Kraton G 4609." The "Kraton" polymers are sold by the Shell Chemical Company.

Methods for preparing the latter block polymers are well known to those skilled in the art; typical procedures being disclosed in U.S. Pat. No. 3,265,765, issued Aug. 9, 1966, hereby incorporated by reference. These procedures generally involve the solution polymerization of a mixture containing the monovinyl aromatic hydrocarbon monomer and the conjugated diene monomer in the presence of a catalyst of the formula $R(Li)_x$ wherein x is an integer having the value of from 1 to 4 and R is a hydrocarbon radical selected from the group consisting of aliphatic, cycloaliphatic and aromatic radicals.

The tackifying resins employed in the adhesive serve to extend the adhesive properties of the block polymer. As contemplated in the invention, suitable "tackifying resins" include:

(1) phenolic-modified terpene resins having a Ball and Ring softening point of from 90° to 150° C., for example, as commercially available under the tradename "Piccofyn A135" made by Hercules, Inc.;

(2) glycerol and pentaerythritol esters of natural and modified rosins, such as, for example, the pentaerythritol ester of hydrogenated rosin, the glycerol ester of polymerized rosin, and the phenolic-modified pentaerythritol ester of hydrogenated rosin, for example, as commercially available under the tradename "Foral 105" by Hercules Inc.;

(3) phthalate ester of hydroabietyl alcohol, commercially available under the tradename "Cellolyn 21" made by Hercules Inc.

(4) natural and modified rosins such, for example, as gum rosin, wood rosin, tall-oil rosin, distilled rosin, hydrogenated rosin, dimerized rosin, and polymerized rosin;

(5) polyterpene resins having a softening point, as determined by ASTM method E28-58T, of from about 80° to 150° C.; the latter polyterpene resins generally resulting from the polymerization of terpene hydrocarbons, such as the bicyclic mono-terpene known as pinene, in the presence of Friedel-Crafts catalysts at moderately low temperatures;

(6) chlorinated terphenyl resins containing from about 42 to 60%, by weight, of chlorine; and (7) aliphatic petroleum hydrocarbon resins having a Ball and Ring softening point of from about 70° to 135° C.; the latter resins resulting from the polymerization of monomers consisting primarily of olefins and diolefins.

It appears that the phenolic modified terpene resin (1) is a preferred ingredient in the adhesive composition in order to obtain the high shear performance desired. However, in order to enhance the apparent tackiness of the adhesive surface and the initial tack of the laminate to a surface, at least one other instant tack enhancing resin such as (2)-(7) is added to the composition.

The stabilizers which are present in the adhesive composition serve to protect the otherwise vulnerable block polymer, and thereby the adhesive system, from oxidative and thermal degradation which are frequently encountered during the manufacture and application of the adhesive as well in the ordinary exposure of the final adhered product. Such degradation is usually manifested by deterioration in appearance, physical properties and performance. Among the applicable stabilizers are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tetiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative stabilizers include:

zinc dibutyldithiocarbamate tetra-bis methylene 3-(3,5-ditertiary-butyl-4-hydroxyphenyl)-proprionate methane 2,2-methylene-bis(4-methyl-6-tertiary butyl phenol)

4,4-thiobis-(6-tertiary-butyl-m-cresol) tri(nonylated phenol)phosphite

The performance of these stabilizers may be further enhanced by utilizing, in conjunction therewith: (1) synergists such, for example, as thiodipropionate esters and phosphites; and (2) chelating agents and metal deactivators such, for example, as ethylenediamine tetraacetic acid, salts thereof, and disalicylalpropylenediimine.

The stabilizers are employed in the adhesive compositions in minor stabilization effecting amounts.

Optional additives may be incorporated into the adhesive such as silane adhesion promoters, such as, vinyltriethoxysilane, γ-methacryloxypropyltrimethoxysilane, γ-glycidoxypropyltrimethoxysilane, γ-mercaptopropyltrimethoxysilane, γ-aminopropyltriethoxysilane, and N-β-(aminoethyl)-γ-aminopropyltrimethoxysilane.

Solvents are used in the preparation and/or application of the adhesive formulations of the present invention and are apparent to those skilled in the art. Typical solvents which are useful in the preparation of the adhesive formulation include aliphatic hydrocarbons such as heptane, aromatic hydrocarbons such as xylene and toluene and aliphatic esters such as n-butyl acetate and ethyl acetate.

The typical ratio of components in the adhesive formulations is as follows:

|  | composition Parts by Weight | |
| --- | --- | --- |
|  | Typical | Preferred |
| Block polymer of monovinyl aromatic hydrocarbons and either conjugated dienes or ethylene-butylene | 40–100 | 50–70 |
| Total tackifying resins | 30–80 | 50–70 |
| Additives (anti-oxidants, adhesive promoters) | 0.5–20 | 2–10 |

The adhesive layer desirably has a thickness of at least 0.0002 inch, preferably in the range of about 0.001 inch to about 0.005 inch, on each adhesive coated face of the foam. While this amount of adhesive is sufficient to anchor the foam contemplated for use in the present invention, larger amounts of adhesives may be mandated for the anchoring of particular structures.

The adhesive layer may be deposited on one or more faces of the foam layer by means of conventional applicator equipment.

A typical coating process employed to produce the laminate product of the present invention is as follows: A 250 Ft. by 56 inch master roll containing 74 lb. per ream paper with a silicone release coating on each side is coated with an adhesive composition in an amount measuring 1.55 to 1.65 ounces per square yard when dried in an oven for four minutes at 220° F. in a continuous process. This adhesive film is then transfer coated to a polyethylene foam type, having a density of six pounds per cubic foot, leaving the residue liner intact. The reverse uncoated side of the polyethylene foam is then directly coated by brushes with 1.90 to 2.00 ounces per square yard of the same adhesive, again drying the resultant laminate for four minutes at 220° F. The mounting tape product is finally wound up in a roll against the other silicone coated side of the paper release liner. The final adhesive coated foam core product formed by this process one transfer coated adhesive layer and one direct coated adhesive layer. The adhesive coated foam products may be either totally transfer coated or directly coated.

The following examples will further illustrate the embodiment of this invention. In these examples all parts given are by weight unless otherwise noted. All times of recorded hours followed by a (+) denotes experiment terminated without failure.

EXAMPLE I

This example illustrates the preparation of a typical adhesive composition of the present invention, its application to a polyethylene foam core and the adhesive performance of the adhesive coated foam core product.

COMPOSITION A

| | Parts |
|---|---|
| Styrene-butadiene-styrene block polymer (Shell Kraton 1101) | 50 |
| Pentaerythritol ester of a hydrogenated rosin (Hercules Foral 105) | 25 |
| Phenolic modified terpene resin (Hercules Piccofyn A 135) | 35 |
| Polyterpene resin (Good year Wingtack 10) | 9 |
| (2,2'-methylene)-bis(4-ethyl-6-tert-butyl phenol) | 1 |
| 3,3'-dilauryl thiodipropionate | 1 |
| Ethyl Acetate | 14 |
| Toluene | 60 |
| Heptane | 91 |
| Solids - 45.6% | |

The adhesive composition of Composition A was applied in an amount of 1.75 ounces (dry) per square yard on silicone paper and then transfer coated on both sides of 1/16" thick polyethylene foam (Volara Type A).

A number of weights of increasing weight were attached to a hook which was supported by a ¼ square inch adhesive coated foam piece as prepared above. This test of shear strength, as the square was hung on a vertical metal surface, demonstrated the superior shear strength of the adhesive as after the weight exceeded ten pounds the adhesive bond did not fail but instead the foam tore.

In a test of shear strength, a five pound weight was attached to a hook supported on a vertical metal surface by a ¼ square inch adhesive coated foam piece (20 lbs/in$^2$) at a temperature of 120° F. No failue was noted after 195 hours after which time the test was terminated.

EXAMPLE 2

This example illustrates the improvement in the use of the adhesive formulations of the present invention in securing polyethylene foam as compared to conventional adhesives mounting tapes:

COMPOSITION B

| | Parts |
|---|---|
| Styrene-butadiene-styrene block polymer (Kraton 1101) | 50 |
| Pentaerythritol ester of a hydrogenated rosin | 25 |
| Phenolic modified terpene resin | 35 |
| Phthalate ester of hydroabietyl alcohol (Hercules Cellolyn 21) | 6 |
| Gamma-Mercaptopropyltrimethoxy silane (Union Carbide A-189) | 1 |
| (2,2'-methylene)-bis(4-ethyl-6-tert-butyl phenol) | 1 |
| 3,3'-dilauryl thiodipropionate | 1 |
| n-Butyl acetate | 165 |

COMPOSITION C

| | Parts |
|---|---|
| Styrene-butadiene-styrene block polymer (Kraton 1101) | 50 |
| Pentaerythritol ester of hydrogenated rosin | 25 |
| Phenolic modified terpene resin | 35 |
| Phthalate ester of hydroabietyl alcohol | 6 |
| Toluene | 82.5 |
| Xylene | 82.5 |
| Gamma-Mercaptopropyltrimethoxy silane | 1 |
| (2,2'-methylene)-bis(4-ethyl-6-tert-butylphenol) | 1 |
| 3,3'-dilauryl thiodipropionate 1 | |
| Solids - 41.9% | |

In this test one square inch section of polyethylene foams were coated with adhesive compositions of the present metal invention and subjected to shear when mounted on a vertical metal surface by supporting weights of either 500 grams, 1000 grams or 5 pounds at various temperatures (158° F., 170° F., or 180° F.). The number of hours for which the adhesive coated polyethylene foam pieces withstood this shear force was recorded. Their shear strength was then compared with the shear strength at identical conditions of the commercial mounting foam tapes manufactured by Morgan D6120 and Sekisui.

TABLE I

| Adhesive Composition | Volara Foam Type$^1$ (Color) | Weight Shears Per in$^2$ | Hours Shear At 158° F. | 170° F. | 180° F. |
|---|---|---|---|---|---|
| C | E (Black) | 500 grams | — | 411+ | 121–136 |
| B | E (White) | 500 grams | — | 411+ | 112+ |
| B | A (White) | 500 grams | — | 260–375 | 15–71 |
| C | E (White) | 500 grams | — | 411+ | 100 |
| Morgan D6120 | | 500 grams | — | <63 | 22 |
| Sekisui | | 500 grams | — | <½ | 1/5 |
| C | E (Black) | 1000 grams | 28½–43½ | 72–87 | 5¼ |
| B | E (White) | 1000 grams | 387+ | 78–93 | 2¾ |
| B | A (White) | 1000 grams | 43½–46¼ | 28 | 2¼ |
| C | E (White) | 1000 grams | 48½–163½ | 6–21 | 6–21 |
| Morgan D6120 | | 1000 grams | 1 | ¾ | ¼ |
| Sekisui | | 1000 grams | <½ | 1/10 | 1/7 |
| C | E (Black) | 5 pounds | 2 | 1 | — |
| B | E (White) | 5 pounds | 2½ | 2 | — |
| B | A (White) | 5 pounds | 5 1/10 | 1 1/10 | — |
| C | E (White) | 5 pounds | 2½ | 1 3/5 | — |
| Morgan D6120 | | 5 pounds | ¼ | ¼ | — |

TABLE I-continued

| Adhesive Composition | Volara Foam Type[1] (Color) | Weight Shears Per in² | Hours Shear At 158° F. | 170° F. | 180° F. |
|---|---|---|---|---|---|
| | Sekisui | 5 pounds | ⅓ | 1/10 | — |

[1]Type A - Crosslinked polyethylene by Voltek, Inc.
Type E - Crosslinked polyethylene copolymer foam by Voltek, Inc.

TABLE II

| Adhesive Composition | Volara Foam Type (Color) | Hours Before Adhesive Failure | Hours Before Non-Adhesive Failure (Foamtore) |
|---|---|---|---|
| C | E (Black) | — | 1033-1048 |
| C | A (White) | 2682+ | — |
| C | E (White) | 2682+ | — |
| C | A (Black) | 2682+ | — |
| A | A (White) | — | 73-136 |
| Morgan D6120 | | 3-18 | — |
| Sekisui | | 1464-1480 | — |

Table I demonstrates the results of the comparative testing of adhesive formulations on polyethylene foam tape with the best competitive mounting tape made by and hereinafter referred to as Morgan D6120 and Sekisui. As can be seen from the results of Table I the adhesive foam composites of the present invention conclusively and consistently outperformed the present commercial mounting tapes with respect to withstanding shear at elevated temperatures.

EXAMPLE 3

Polyethylene foam pieces measuring ¾" by 1⅜" supporting a plastic hook were adhered to a stainless steel wall supporting a five pound weight on the hook in a humidity chamber maintaining 100% relative humidity at 100° F. Table II demonstrates the results of this test using various adhesive formulations of the present invention and contrasts the results with the results of the tests which used the commercially available mounting tapes of Morgan D6120 and Sekisui.

EXAMPLE 4

Adhesive Composition B and C were coated on ¼ square inch pieces of both Volara foam types A and E. The adhesive compositions were transfer coated on one side of the 1/32 of an inch thick foam and directly coated on the other side of the foam. The adhesive coated foam cores were then used to support plastic pieces containing a hook against a stainless steel wall. The adhesive foam core pieces were varied in that the following tests were conducted with one piece being adhered so that the directly coated adhesive side faced the plastic hook (represented by D on Table III) while another piece undergoing the same tests had the transfer coated adhesive side facing the plastic hook (represented by T on Table III). Tests were then conducted for adhesion strength and shear strength (at room temperature and at 125° F.) for both freshly adhered composites (unaged) and composites which were aged for seven days at 158° F.

In Table III the adhesion numbers listed are the number of pounds per square inch which were applied to the hook without adhesive failure before the foam tore. In all cases the foam tore before adhesive failure occurred except for the aged samples of direct coating against the plastic hook using adhesive composition B on the E White and E Black type foam.

Weights of five pounds were hung from the plastic hooks adhesively supported by the ¼ square inch composites of the present invention to measure shear in hours before adhesive failure. Likewise one kilogram weights were supported by hooks secured by ¼ square inch composites at 125° F. to test for the hours of withstanding shear until adhesive failure at an elevated temperature.

TABLE III

| Volara Foam Type | Coated Side To Hook | ADHESIVE COMPOSITION B | | | | ADHESIVE COMPOSITION C | | | |
|---|---|---|---|---|---|---|---|---|---|
| | | A White | A Black | E White | E Black | A White | A Black | E White | E Black |
| UNAGED | | | | | | | | | |
| Adhesion (lb/in²) | D | 8½ | 8 | >10 | >10 | 8 | 8½ | >10 | 10 |
| | T | 8½ | 8½ | >10 | 10 | 8½ | 8 | >10 | >10 |
| 5 lb. Shear per ¼ in. (hours) | D | 341-429 | 677-740 | 173-188 | 169-232 | 242-306 | 27744+ | 169-232 | 264-352 |
| | T | 270-286 | 3840+ | 146 | 289-304 | 341-429 | 2424-2440 | 797-813 | 600-663 |
| 1 kg. Shear per ¼ in² /125° F. (hours) | D | 1106-1126 | 914-930 | 3837+ | 173-236 | 510-575 | 3602 | 3827+ | 2444+ |
| | T | 986-1002 | 1106-1126 | 3837+ | 147 | 986-1002 | 2472 | 510-575 | 1700 |
| AGED | | | | | | | | | |
| Adhesion (lb/in²) | D | 8½ | >10 | 5½ | 5½ | 8 | 9½ | 9 | >10 |
| | T | 9 | >10 | 8 | >10 | 7½ | 9 | >10 | >10 |
| 5 lb. Shear per ¼ in² (hours) | D | 192 | 330 | 54-70 | 22 | 403 | 434-522 | 46 | 24 |
| | T | 403 | 97-113 | 46 | 2-17 | 166 | 415-479 | 50-65 | 46 |
| 1 kg. Shear per ¼ in² /125° F. (hours) | D | 196 | 245-308 | 54-70 | 27 | 238 | 574-662 | 77-140 | 148 |
| | T | 77 | 24 | 52 | 72 | 385 | 410-427 | 77-140 | 72 |

EXAMPLE 5

A polyvinyl chloride plastisol foam piece measuring one square inch was transfer coated with adhesive composition C. This laminate was adhered to a plaster wall and used to support a five pound weight under conditions of ambient temperature and 80 percent relative humidity. The adhesive failed after 120 hours.

The pressure sensitive adhesive laminates of the present invention should resist a shear force of 500 grams per square inch at 158° F. for at least 96 hours, preferably at least 150 hours without significant creep. These laminates should resist a shear force of 1 Kg per ¼ square inch at 125° F. for at least 100, preferably 200, and most preferably 1000 hours.

What is claimed is:

1. A pressure sensitive adhesive laminate which initially resists a shear force of 1 kg. per ¼ at 125° F. for at least 200 hours comprising:
   (a) a foamed layer selected from the group consisting of foamed poly-α-monoolefin, a copolymer of an α-monoolefin copolymerized with minor amounts of another copolymerizable momoner and formed polyvinyl resin having bonded to at least one surface thereof,
   (b) a layer of pressure sensitive adhesive comprising:
      (i) 40 to 100 parts of a block copolymer of a monovinyl aromatic hydrocarbon and a conjugated diene or ethylene-butylene,
      (ii) 30 to 80 parts of at least two distinct tackifying resins, and
      (iii) 0.5 to 20 parts of at least one oxidation stabilizer and at least one silane adhesion promoter.

2. The laminate of claim 1 wherein the foamed layer has a layer of adhesive bonded to at least two major surfaces.

3. The laminate of claims 1 or 2 wherein the foamed layer is a thin layer less than about ½ inch thick.

4. The laminate of claim 1 or 2 which resists said shear force for at least 1000 hours.

5. An automotive body having an article adhered thereto by means of the laminate of claim 1.

6. The laminate of claims 1 or 2 which initially resists a shear force of 500 grams per square inch at 158° F. for at least 96 hours.

7. A pressure sensitive adhesive laminate which initially resists a shear force of 1 kg. per ¼ inch at 125° F. for at least 200 hours comprising:
   (a) a foamed layer selected from the group consisting of foamed poly-α-monoolefin, a foamed copolymer of an α-monoolefin copolymerized with minor amounts of another copolymerizable monomer and foamed polyvinyl resin having bonded to at least one surface thereof,
   (b) a layer of pressure sensitive adhesive comprising:
      (i) 40 to 100 parts of a block copolymer of a monovinyl aromatic hydrocarbon and a conjugated diene or ethylene-butylene,
      (ii) 30 to 80 parts of a phenol-terpene tackifying resin having a softening point from about 80° C. to about 150° C. and at least one other tackifying resin, and
      (iii) 0.5 to 20 parts of at least one oxidation stabilizer.

8. A pressure sensitive adhesive laminate which initially resists a shear force of 1 kg. per ¼ inch at 125° F. for at least 200 hours comprising:
   (a) a foamed layer selected from the group consisting of a closed cell cross-linked polyethylene foam and closed cell cross-linked polyethylene copolymer foam containing a minor amount of copolymerized vinyl acetate having bonded to at least one surface thereof,
   (b) a layer of pressure sensitive adhesive comprising:
      (i) 40 to 100 parts of a block copolymer of a monovinyl aromatic hydrocarbon and butadiene,
      (ii) 30 to 80 parts of at least two distinct tackifying resins, and
      (iii) 0.5 to 20 parts of at least one oxidation stabilizer and at least one silance adhesion promoter.

* * * * *